United States Patent Office 2,809,913
Patented Oct. 15, 1957

2,809,913

DIMETHYLTOLUTHIONINE CHLORIDE HEMOSTATIC COMPOSITION

Donald A. Hoff, Columbus, Ohio, assignor to The Warren-Teed Products Company, Columbus, Ohio, a corporation of Ohio No Drawing. Application May 23, 1955,
Serial No. 510,565

5 Claims. (Cl. 167—53)

This invention relates to improvements in hemostatic agents and particularly those used in veterinary medicine.

The presently known hemostatic agents used in cases of hemorrhage are effective only in certain well defined ranges and where the cause of such hemorrhaging is known or can be determined. However, in many such cases, the cause is not known and there is not sufficient time or facilities available to determine the cause. It is accordingly one of the objects of the present invention to provide an improved hemostatic agent, which is effective in controlling hemorrhaging over a much wider range than heretofore possible with any of the known hemostatic agents, in that it is effective against a larger group of causes of hemorrhage than any of the presently known or used hemostatic agents.

It is an object of this invention to provide a quick and highly effective and safe systemic hemostatic agent for use in veterinary medicine. It is a particular object of this invention to provide a hemostatic agent which may be used in prophylaxis in control of hemorrhage due to trauma, surgical procedures, uterine bleeding, epispaxis and similar causes in dogs, cats, horses and other animals.

Another object of this invention is to provide an hemostatic agent which is instantly ready for use without reconstitution.

A still further object of this invention is to provide an hemostatic agent which may be administered intravenously, subcutaneously, orally, intramuscularly or intraperitoneally.

Yet another object of this invention is to provide an hemostatic agent which may be administered in the surgical field by continuous drip to the bleeding surface.

Still another object of this invention is to provide a stable composition which is not affected by severe changes in temperature.

Another object of this invention is to provide an hemostatic agent which may be administered without deleterious effect to dogs, cats, rabbits, mice, cows, horses and other animals, including young, middle aged and old animals.

Still another object of this invention is to provide an hemostatic agent which is non-toxic at high or low levels of administration using indicated therapeutic dosages or multiples of indicated therapeutic dosages.

Yet another object of this invention is to provide an hemostatic agent which may be administered to pregnant animals without injury to the foetus.

Another object of this invention is to provide an hemostatic agent which may be administered simultaneously with a variety of drugs or other medication such as dextran (blood plasma expander), morphine, whole blood, urinary acidification therapy, and hyaluronidase therapy.

A further object of this invention is to provide an hemostatic agent which effectively lessens the amount of purulent exudation when used topically to control hemorrhage in septic wounds.

These and other objects and advantages of this invention will be apparent from the following description and claims.

This invention comprises a combination of well known chemical substances and specifically is an aqueous solution of reagent grade propylcarbinol (n-butanol) and dimethyltoluthionine chloride. The solution is made isotonic with sodium chloride. The following formula is one which has been used effectively on animals such as the aforementioned.

Formula

Propylcarbinol, C. P. _____ 7.0% (v./v.).
Dimethyltoluthionine chloride (Toluidine Blue O) _____ 0.002% (w./v.).
Sodium chloride, U. S. P. _____ 0.9% (w./v.).
Distilled water, q. s.

The dimethyltoluthionine chloride (Toluidine Blue O) is dissolved in freshly-distilled water, and the propylcarbinol C. P. (n-butyl alcohol) ingredient is added. The solution is made isotonic with sodium chloride. The mixture is heated at 70° centigrade for three hours and cooled to room temperature. It is then filtered through a "fine" fritted glass filter and placed into vials. The vials are stoppered with rubber stoppers and aluminum seals and caps are then applied. The filled vials are pasteurized at 60° centigrade for one hour on three successive days.

The method of standardization of the dimethyltoluthionine chloride (Toluidine Blue O) is essential in obtaining the required therapeutic effect and is as follows:

The assay is dependent upon the blue color of Toluidine Blue O. The spectrophotometric absorption curve has a point of maximum absorbancy at 610 m./u. with a specific absorbancy $$(E_{1\,cm.}^{1\%})$$

of 1580. Specific absorbancy is determined on a sample of standardized Toluidine Blue O of known purity (determined by a titanium chloride titration). The sample of Toluidine Blue O to be tested is made to a concentration of 2 mcg./cc. in water and its absorbancy determined against a water blank at 610 m./u. on the Beckman model B spectrophotometer.

Percent Toluidine Blue O =

$$\frac{100 \times \text{absorbancy of sample solution at } 610 \text{ m./u.}}{0.316}$$

It is possible that the formula may be varied to some extent percentagewise within a limited range. The example given above, however, has been found to be the most effective.

The therapy of this invention does not contraindicate the usual supportive therapy, such as dextran and whole blood. The function of this formula is to speed the quick formation of a solid clot and to prevent or minimize blood loss.

Having thus described my invention what I claim is:

1. A hemostatic agent comprising an aqueous solution of reagent grade propylcarbinol and dimethyltoluthionine chloride, said propylcarbinol being in a ratio of substantially 7.0%.

2. A hemostatic agent comprising an aqueous solution of reagent grade propylcarbinol and dimethyltoluthionine chloride, said dimethyltoluthionine chloride being in a ratio of substantially 0.002%.

3. A hemostatic agent comprising an aqueous solution of reagent grade propylcarbinol, dimethyltoluthionine chloride, and sodium chloride, said dimethyltoluthionine chloride being in a ratio of substantially .002%.

4. A hemostatic agent comprising an aqueous solution of reagent grade propylcarbinol, dimethyltoluthionine chloride, and sodium chloride, said propylcarbinol being in a ratio of substantially 7.0%.

5. A hemostatic agent comprising an aqueous solution of reagent grade propylcarbinol, dimethyltoluthionine chloride, and sodium chloride, said sodium chloride being in a ratio of 0.9%.

References Cited in the file of this patent
UNITED STATES PATENTS
2,571,593    March _____ Oct. 16, 1951

OTHER REFERENCES

Allen: Surg. Gyn. and Obst., vol. 89, July-December 1949, pp. 692–703 (pp. 692 and 700 pert.).

Merck Index, 6th ed., 1952, Merck and G. Rahway, N. J., pp. 963 and 964.